(12) United States Patent
Basu Mallick et al.

(10) Patent No.: US 8,949,793 B1
(45) Date of Patent: Feb. 3, 2015

(54) TEST BED DESIGN FROM CUSTOMER SYSTEM CONFIGURATIONS USING MACHINE LEARNING TECHNIQUES

(71) Applicant: EMC Corporation, Hopkinton, MA (US)

(72) Inventors: Sumit Basu Mallick, Bangalore (IN); Ajith Balakrishnan, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 119 days.

(21) Appl. No.: 13/721,836

(22) Filed: Dec. 20, 2012

(51) Int. Cl.
*G06F 9/44* (2006.01)

(52) U.S. Cl.
USPC .......................................................... 717/124

(58) Field of Classification Search
USPC ......... 717/104, 176, 124; 707/5, 100; 703/20; 704/10
See application file for complete search history.

(56) References Cited

U.S. PATENT DOCUMENTS

| | | | |
|---|---|---|---|
| 2006/0100842 A1* | 5/2006 | Dominguez et al. | 703/20 |
| 2008/0010304 A1* | 1/2008 | Vempala et al. | 707/100 |
| 2008/0120292 A1* | 5/2008 | Sundaresan et al. | 707/5 |
| 2008/0215314 A1* | 9/2008 | Spangler | 704/10 |
| 2010/0229150 A1* | 9/2010 | Stone et al. | 717/104 |
| 2011/0107327 A1* | 5/2011 | Barkie et al. | 717/176 |

* cited by examiner

*Primary Examiner* — Tuan A Vu
(74) *Attorney, Agent, or Firm* — BainwoodHuang

(57) ABSTRACT

Designing a test bed for testing a computer product includes (1) obtaining customer configuration data describing different system configurations in which the computer product is used, (2) preprocessing the customer configuration data to generate structured customer configuration, (3) applying a classification to the structured customer configuration data to separate the distinct system configurations into groupings according to similarity in one or more of the system attributes among members of each group, and (4) for each grouping, identifying a representative system configuration to be used for testing and generating a corresponding set of test bed definition data describing the representative system configuration to enable implementation. The classification may employ clustering analysis, and supplementary and/or backup techniques may be included.

22 Claims, 4 Drawing Sheets

TEST BED DESIGN FROM CUSTOMER SYSTEM CONFIGURATIONS USING MACHINE LEARNING TECHNIQUES

BACKGROUND

Computer system products, including both hardware and software products, can be deployed in many different customer configurations. Factors that contribute to a proliferation of customer configurations in which a product is deployed include:

Wide variety of systems that result from customers' specific needs

Different operating systems and hardware architectures

Numerous combinations of different software, storage, and interconnects across a number of customer systems It is known to test computer system products in test environments or "test beds" to verify that the products as designed function properly in the system configurations that they will be deployed in. Testing may be designed based on a number of factors including major contexts of deployment (e.g., large datacenter versus small office), known issues from deployments of preceding or related products, known sensitivities or vulnerabilities, etc.

SUMMARY

For many computer products, testing is made more difficult by the use of the product in a large number of different system configurations. A test bed designed using prior approaches may not sufficiently represent customer environments. The consequence is unforeseen issues reported from the field. Normal methods employed to create test beds are not suitable in these situations. It is not possible to test the product on all possible customer configurations.

An approach is described for using a machine learning method to this problem. It involves using data mining and machine learning techniques to identify natural clusters of customer configurations and typical representatives of the clusters that can be used to create more accurate test beds. Data may be obtained from various sources including tools deployed in customer environments. By this technique, test systems are designed that achieve a desired trade-off between accuracy (relevance of test results to actual customer environments) and efficiency (minimizing use of test resources).

More particularly, a method is disclosed of designing a test bed for testing of a computer product. The method includes the following operations:

1. Obtaining customer configuration data describing a number of different system configurations in which the computer product is deployed and operated. The system configurations vary according to distinct system attributes including software attributes describing different software executed by the systems as well as hardware attributes describing different types and capacities of hardware resources of the systems.
2. Preprocessing the customer configuration data to generate structured customer configuration data according to a predetermined data organization that can be understood by later operations of the workflow. The preprocessing includes removing redundant data in the customer configuration data and removing data not relevant to designing the test bed.
3. Applying a classification to the structured customer configuration data to separate the distinct system configurations into groupings according to similarity in one or more of the system attributes among members of each group.
4. For each of the groupings, identifying a corresponding representative system configuration to be used for testing in the test bed and generating a corresponding set of test bed definition data. Each set of test bed definition data describes the corresponding representative system configuration in a form enabling implementation of the representative system configuration in the test bed.

Generally, the disclosed technique has certain advantages over former approaches such as the following:

1) Helps to create an optimal number of test beds in such a way that all known customer configurations are adequately represented.
2) Due to more accurate representation of customer configurations, it improves the chances of identifying issues that could be encountered in customer deployments, enabling proactive addressing of the issues and improving customer experience with the product.
3) The system can be used to recommend specific configurations for specific purposes.
4) The system can also be used to gain insights into the way customers deploy products, e.g., different combinations of product applications, types and scales of configurations for particular use cases, etc.

Application of a machine learning system may not be limited to the testing case. A similar approach may be used to gain insights into the ways that customers deploy products, where such insights may inform product development, marketing/sales, or other business activities.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
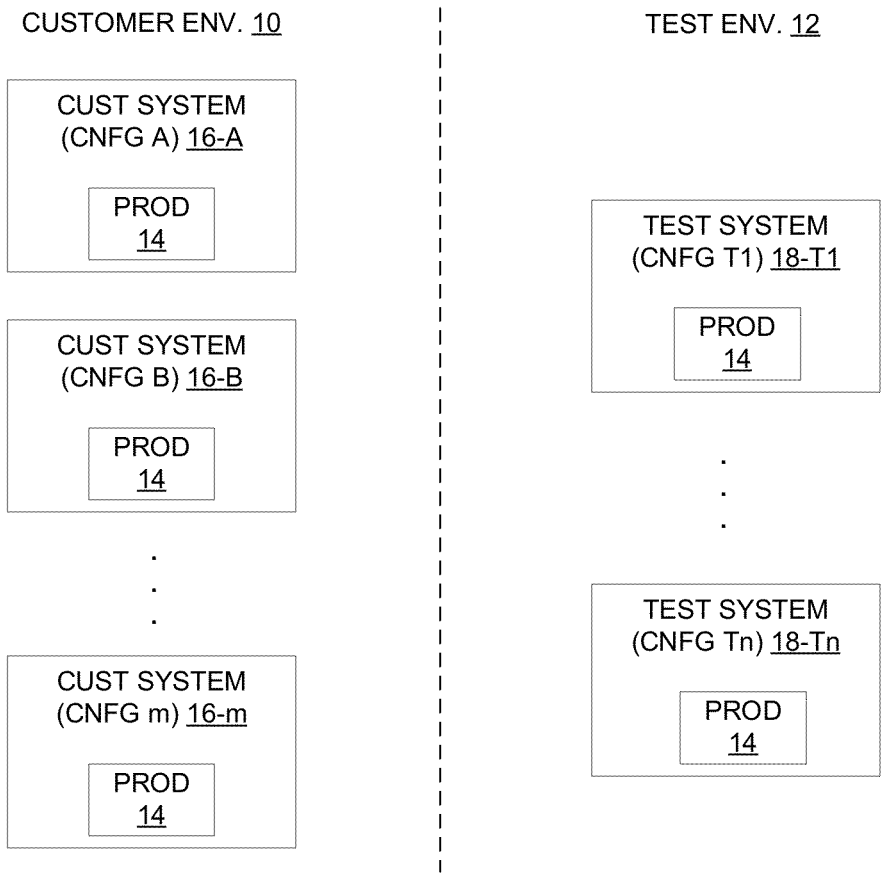
FIG. 1 is a schematic block diagram showing systems in customer and test environments.

FIG. 1 shows two different domains involved in the presently disclosed technique, specifically a customer environment 10 and a test environment 12. In both environments 10, 12 are instances of a product 14 that is the subject of testing in the test environment 12. In one common application, the test environment 12 may be operated by or on behalf of a manufacturer of the product 14 and used to test the product 14 before release or other deployment to customers or other product users. In the customer environment 10, the product 14 is included in a variety of customer systems (CUST SYS- TEMs) 16 of different configurations, identified as CNFG A, CNFG B, . . . , CNFG m in FIG. 1. The customer systems 16 are computer systems and the product 14 is a computer system product; more detailed information about these is given below. One purpose of testing is to evaluate proper operation of the product 14 in the different system configurations in the customer environment 10. To that end, the test environment 12 includes a set of distinct test systems 18 of different configurations, identified as CNFG T1, CNFG T2, . . . CNFG Tn in FIG. 1.

In general, one goal in the design of the test environment 12 is that it provides test results that are highly indicative of proper operation of the product 14 in the set of distinct customer system configurations, which may be quite large and variable. Another goal is to achieve such results while generally minimizing the size of and resources consumed by the test environment 12. Accordingly, it is desirable for the set of test systems 18 to represent the customer systems 16 in an efficient manner.

Figure 2:
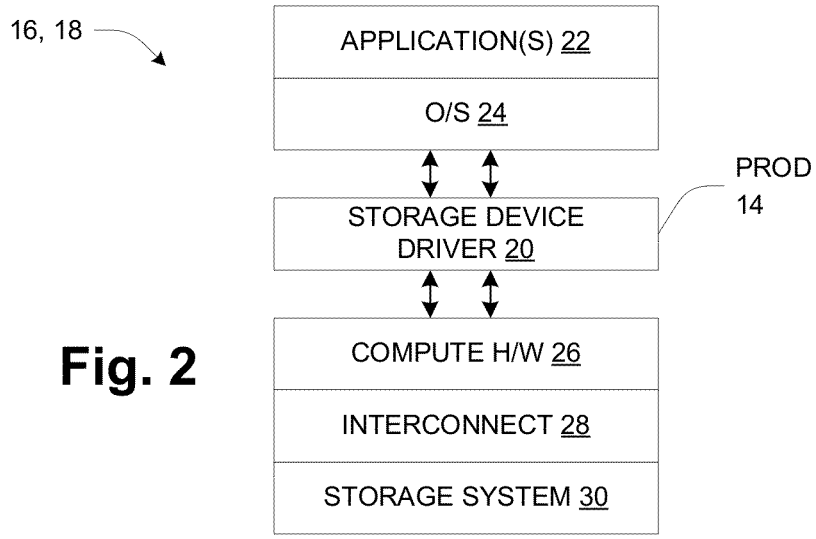
FIG. 2 is a schematic diagram of an organization of a system.

FIG. 2 provides a schematic illustration of a customer system 16 and a test system 18 in one embodiment. In this particular example, the product 14 is a storage device driver 20, which is a software product installed in a computer system to enable access to secondary storage devices/systems (e.g., disk drive arrays) as generally known in the art. A commercial example of a storage device driver 20 is a product called PowerPath® sold by EMC Corporation. A system including the driver 20 also includes software and hardware components whose composition may vary in different system configurations. Example software components include applications 22 and operating system (O/S) 24; example hardware components include compute hardware 26 (CPUs, memory, I/O circuitry, etc.), interconnect 28 and storage system 30. Variations in these components may be in type and/or in number or capacity. For example, the O/S 24 may be one of multiple possible types such as Windows, Linux, etc. Examples of different numbers or capacities that may be meaningful from a test perspective include the number of CPUs, the amount of memory, the number of distinct connection or ports to external devices, etc. In the particular case of a multipathing storage device driver 20 such as PowerPath, for example, external connections may be via a number of host bus adapters or HBAs that also can vary across different configurations.

It will be appreciated that there may be quite a large number of distinct configurations in which the driver 20 can be used, given the number of different components of interest and the individual variabilities. The relationship is generally exponential—each additional component type or attribute to be accounted for generally increases the number of potential configurations by a corresponding multiplicative factor. Hence the above-discussed problem of achieving an acceptable level of test coverage, addressed by the presently disclosed technique.

Figure 3:
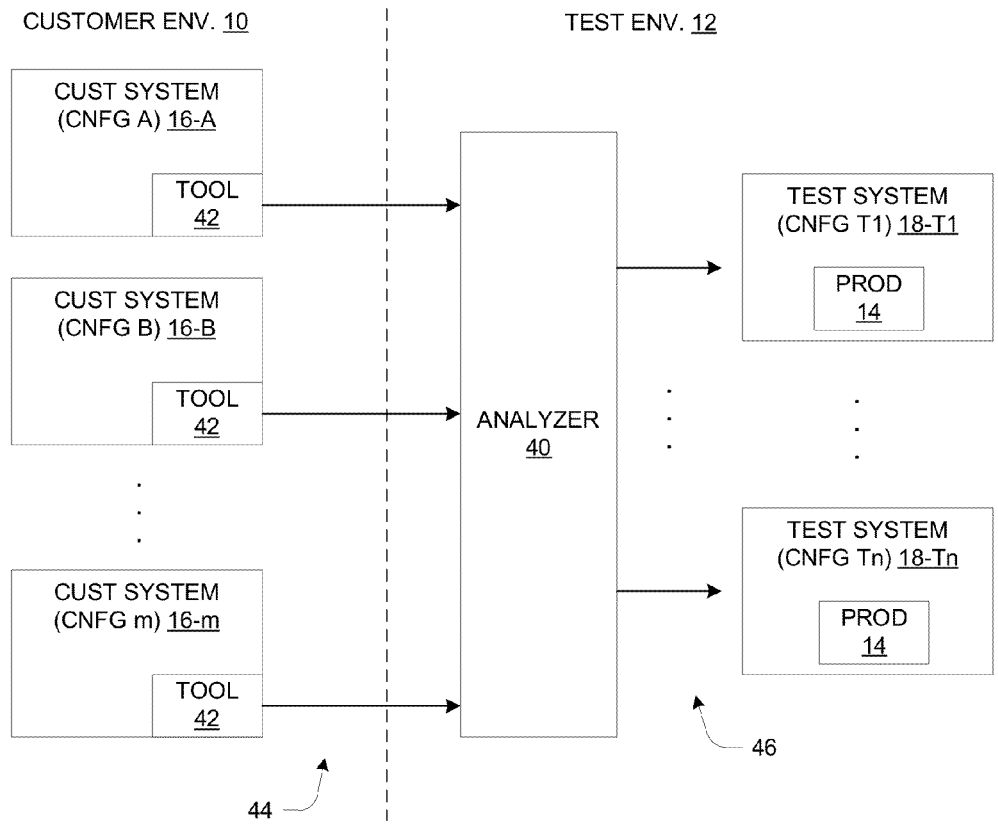
FIG. 3 is a schematic block diagram showing use of an analyzer in the test environment.

FIG. 3 provides a schematic depiction at a high level of a technique for assisting in the design of the test systems 18 to the ends described above, i.e., to obtain highly indicative test results with efficient use of resources (test systems 18) of the test environment 12. Overall, the technique involves use of an analyzer 40 in the test environment 12 along with one or more data-gathering tools (TOOLs) 42 in the customer environment 10. Each tool 42 gathers information regarding the configuration(s) of one or more customer systems 16 and provides the information as customer configuration data 44 to the analyzer 40. The analyzer 40 uses the customer configuration data 44 as described below to generate test bed configuration data 46 representing configurations of test systems 18 to be used. Because the configurations of the test systems 18 are arrived at based on actual uses of the product 14 in the customer systems 16, test results may be more highly indicative with respect to the entire set of distinct configurations of customer systems 16, without requiring an undue number of test systems 18.

Figure 4:
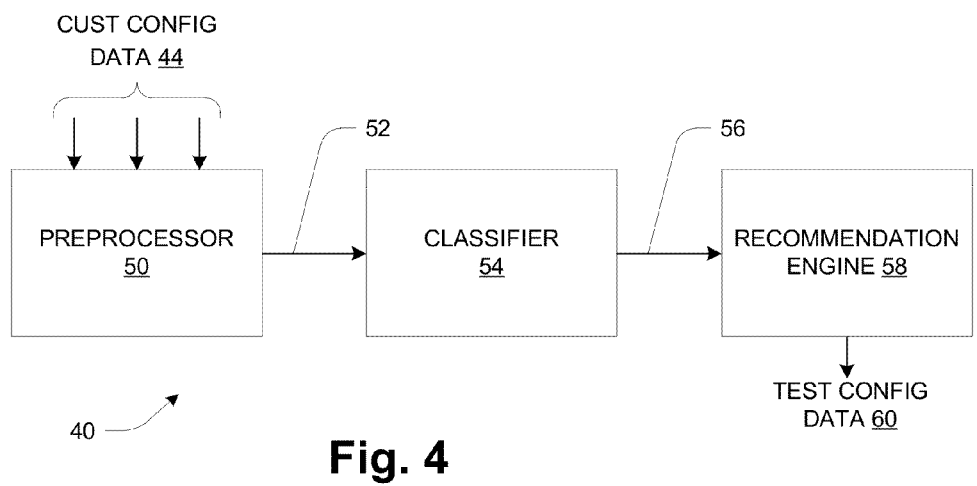
FIG. 4 is a block diagram of an analyzer.

FIG. 4 shows an organization of the analyzer 40. It includes a preprocessor 50 that receives the customer configuration data 44 and generates structured customer configuration data 52; a classifier 54 that receives the structured customer configuration data 52 and generates cluster or grouping data 56; and a recommendation engine 58 that receives the cluster or grouping data 56 and generates test configuration data 60 reflecting recommended configurations of the test systems 18.

Operation is generally as follows:

1) Obtain customer configuration data 44 from various sources (tools 42). These data may be semi-structured or unstructured. Examples of semi-structured data include data generated by host-resident reporting tools 42 such as EMCgrab, or topology map data from system/network topology mapping tools 42. Examples of unstructured data source include logs/transcripts of customer service calls, etc.

2) The customer configuration data 44 is fed into the preprocessor 50, which converts the input data from the various sources to structured format. This structured data includes multiple attributes in the customer configuration such as number of CPUs, size of memory, number of HBAs, size of storage, identities of applications, etc.

3) The classifier 54 then performs certain processing to group the structured data 52 into classes or groupings, where members of each group exhibit certain similarities that distinguish them from members of other groups. Classification generally considers multiple attributes of the systems 16—examples are given below. A clustering form of analysis may be used, in which case a mean or "centroid" of each cluster may be identified as representative of the set of configurations included in the cluster. It should be noted that not all attributes may be equally important, and thus some form of weighting scheme may be used to apply different weights to the attributes to shape the manner of grouping/clustering accordingly.

K-means clustering (or one of its several variants) is a typical example of a machine learning technique that can be used in this kind of clustering problem. It essentially involves partitioning n observations into k clusters in which each observation is assigned to the cluster whose mean is closest to the observed value. In this case the classifier 54 may also include methods for validation of clustering results, as well as techniques to identify the most suitable 'k' value automatically.

4) Finally, the recommendation engine 58 generates test configuration data 60 defining a set of test systems 18 for testing the product 14 based on the grouping data 56 from the classifier 54. Generally, the test configuration generated for a given group or cluster is a configuration deemed to well represent all members of the group in pertinent respects for purposes of meaningful testing. To generate the test configuration data 60, the recommendation engine 58 may also employ separate context information, such as known constraints of the testing, historical knowledge such as known issues, vulnerable areas of the products, etc.

One function of the preprocessor 50 is to remove data from the customer configuration data 44 that is redundant or not pertinent to testing. For the latter, the preprocessor 50 is aware of those attributes of the customer configurations that are relevant to the product 14. For a driver 20 such as Power- Path®, relevant attributes include the number of CPUs, the size of memory, the number of HBAs, the size of storage, the identities of applications, etc. A specific example is given below. The output of the preprocessor 50 is preferably in a format enabling straightforward parsing of attribute names and values as well as other relevant information. Examples include comma-separated variables (CSV) and Extensible Markup Language (XML) formats.

With respect to the recommendation engine 58, it may use other statistical techniques such as Pareto analysis to come up with optimal test bed definitions. The Pareto principle states that a large majority of problems are produced by a few key causes. Identifying natural groups of customer configurations and finding the typical representatives of those clusters essentially helps in identifying these fewer key causes that may be best to focus on while creating test beds.

In some cases a customer may have a number of highly different configurations that cannot be combined into clusters, i.e., no meaningful classes exist. The classifier 54 may monitor for this situation and report it upon encountering it in operation. In this case, the recommendation engine 58 may fall back on conventional methods of creating test configurations, such as by consideration of product features, resource constraints, historical data, etc.

Figures 5, 6:
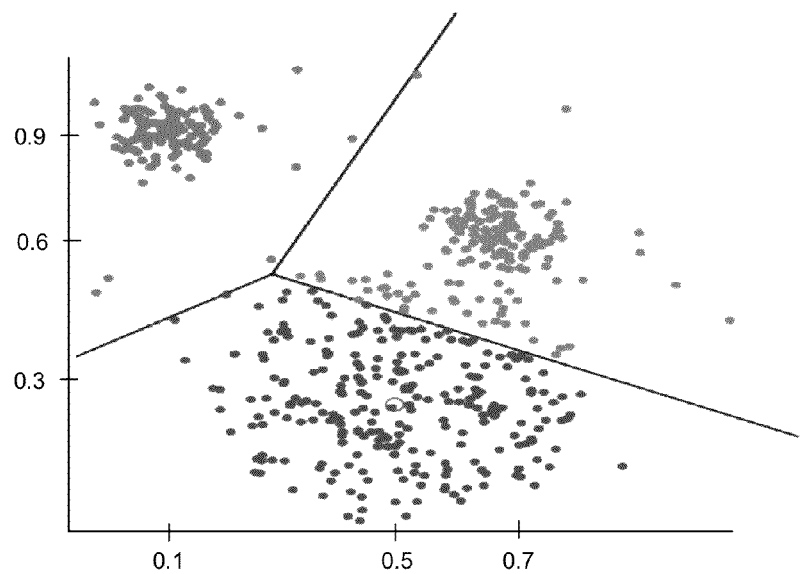
FIG. 5 is a plot of samples and clustering applied thereto.
FIG. 6 is a table showing clustering results for a set of systems.

FIG. 5 shows an abstract example of a clustering analysis in a two-dimensional sample or observation space. In this case, the data are divided into three clusters having respective centroids near the points (0.1, 0.9), (0.5, 0.3), and (0.7, 0.6). It will be appreciated that the above-described analysis is generally of a higher order, depending on the number of attributes of interest. The observations may also be more discretized.

FIG. 6 shows a more concrete example for a hypothetical set of customer systems 16. Clustering is according to five system attributes: O/S, model name, number of CPUs, version of PowerPath, and number of HBAs. As shown, configuration data of 35 systems ("full data") was analyzed, and the configurations were grouped into three clusters with populations of 18, 5 and 12. The members of cluster 0 share the attributes of 2 CPUs, 2 HBAs, and PowerPath version 5.1 SP1. The other two clusters are somewhat more similar to each other, differing only in the number of CPUs and the model. It will be appreciated that testing three configurations may be much more efficient than testing however many distinct configurations are found among the 35 systems.

Figure 7:
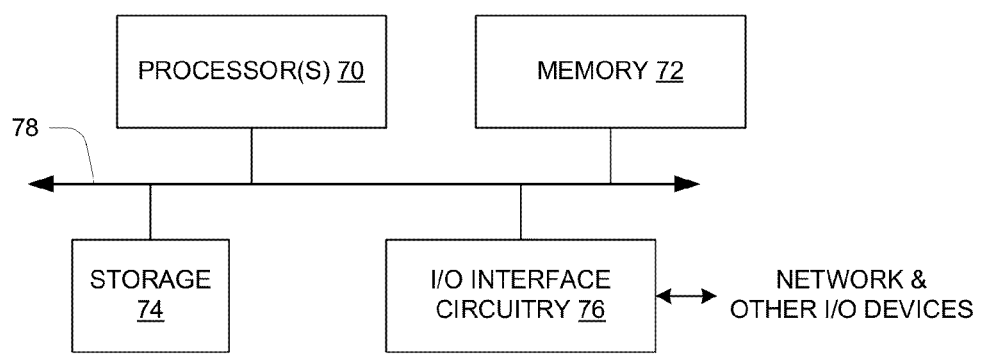
FIG. 7 is a block diagram showing hardware organization of a computer.

FIG. 7 is a generalized depiction of a computer such as may be used to realize the systems 16, 18 as well as the analyzer 40. It includes one or more processors 70, memory 72, local storage 74 and input/output (I/O) interface circuitry 76 coupled together by one or more data buses 78. The I/O interface circuitry 76 couples the computer to one or more external networks, additional storage devices or systems, and other input/output devices as generally known in the art. System-level functionality of the computer is provided by the hardware executing computer program instructions (software), typically stored in the memory 72 and retrieved and executed by the processor(s) 70. Any description herein of a software component performing a function is to be understood as a shorthand reference to operation of a computer or computerized device when executing the instructions of the software component. Thus, the analyzer 40 is a computer executing instructions of an analyzer application that embodies the structure and functionality described above. Also, the collection of components in FIG. 7 may be referred to as "processing circuitry", and when executing a given software component may be viewed as a function-specialized circuit, for example as a "mapping circuit" when executing a software component implementing a mapping function.

To the extent that computer program instructions (software) are employed in any particular embodiment, such instructions may be recorded on a non-transitory computer readable medium such as a magnetic disk, optical disk, semiconductor memory, etc.

While various embodiments of the invention have been particularly shown and described, it will be understood by those skilled in the art that various changes in form and details may be made therein without departing from the spirit and scope of the invention as defined by the appended claims.

What is claimed is:

1. A method of designing a test bed for testing of a computer product, comprising:
   obtaining customer configuration data describing a plurality of distinct system configurations in which the computer product is deployed and operated, the distinct system configurations varying according to a plurality of distinct system attributes, the system attributes including software attributes describing different software executed by the systems as well as hardware attributes describing different types and capacities of hardware resources of the systems;
   preprocessing the customer configuration data to generate structured customer configuration data according to a predetermined data organization, the preprocessing including removing redundant data in the customer configuration data and removing data not relevant to designing the test bed;
   applying a classification to the structured customer configuration data to separate the distinct system configurations into groupings according to similarity in one or more of the system attributes among members of each group; and
   for each of the groupings, identifying a corresponding representative system configuration to be used for testing in the test bed and generating a corresponding set of test bed definition data therefor, each set of test bed definition data describing the corresponding representative system configuration in a form enabling implementation of the representative system configuration in the test bed,
   wherein applying the classification and identifying the representative system configurations is performed in a first case in which only a first number of the system configurations are highly different, and including, in a second case in which a second number greater than the first number of the system configurations are highly different, utilizing other criteria for designing the test bed, the other criteria selected from product features, resource constraints and historical data.

2. A method according to claim 1, wherein the system attributes relate to hardware configurations of the distinct system configurations.

3. A method according to claim 2, wherein the system attributes include number of CPUs and size of memory.

4. A method according to claim 2, wherein the computer product being tested is a storage device driver, and wherein the system attributes include number of host bus adapters providing respective ports to external storage devices.

5. A method according to claim 1, wherein applying the classification includes performing a clustering analysis, the groupings are respective clusters created by the clustering analysis, and the representative system configuration for each grouping is a centroid of the respective cluster.

6. A method according to claim 5, wherein the clustering analysis is a k-means analysis.

7. A method according to claim 5, wherein the clustering analysis applies unequal weights to the system attributes.

8. A method according to claim 1, wherein identifying the representative system for each grouping includes selecting one of the system configurations of the grouping whose attribute values have maximal sharing among the group members.

9. A method according to claim 1, wherein identifying the representative system includes utilizing context information drawn from known constraints of the testing, known issues to be tested for, and vulnerable areas of the product.

10. A method according to claim 1, wherein identifying the representative system includes utilizing statistical techniques to find the representatives of the groupings of system configurations.

11. A method according to claim 1, wherein applying the classification includes monitoring for the second case and reporting it upon encountering it in operation.

12. A non-transitory computer-readable medium storing computer program instructions, the instructions being executable by a set of one or more computers to cause the computers to perform a method of designing a test bed for testing of a computer product, the method including:
    obtaining customer configuration data describing a plurality of distinct system configurations in which the computer product is deployed and operated, the distinct system configurations varying according to a plurality of distinct system attributes, the system attributes including software attributes describing different software executed by the systems as well as hardware attributes describing different types and capacities of hardware resources of the systems;
    preprocessing the customer configuration data to generate structured customer configuration data according to a predetermined data organization, the preprocessing including removing redundant data in the customer configuration data and removing data not relevant to designing the test bed;
    applying a classification to the structured customer configuration data to separate the distinct system configurations into groupings according to similarity in one or more of the system attributes among members of each group; and
    for each of the groupings, identifying a corresponding representative system configuration to be used for testing in the test bed and generating a corresponding set of test bed definition data therefor, each set of test bed definition data describing the corresponding representative system configuration in a form enabling implementation of the representative system configuration in the test bed,
    wherein applying the classification and identifying the representative system configurations is performed in a first case in which only a first number of the system configurations are highly different, and including, in a second case in which a second number greater than the first number of the system configurations are highly different, utilizing other criteria for designing the test bed, the other criteria selected from product features, resource constraints and historical data.

13. A non-transitory computer-readable medium according to claim 12, wherein the system attributes relate to hardware configurations of the distinct system configurations.

14. A non-transitory computer-readable medium according to claim 13, wherein the system attributes include number of CPUs and size of memory.

15. A non-transitory computer-readable medium according to claim 13, wherein the computer product being tested is a storage device driver, and wherein the system attributes include number of host bus adapters providing respective ports to external storage devices.

16. A non-transitory computer-readable medium according to claim 12, wherein applying the classification includes performing a clustering analysis, the groupings are respective clusters created by the clustering analysis, and the representative system configuration for each grouping is a centroid of the respective cluster.

17. A non-transitory computer-readable medium according to claim 16, wherein the clustering analysis is a k-means analysis.

18. A non-transitory computer-readable medium according to claim 16, wherein the clustering analysis applies unequal weights to the system attributes.

19. A non-transitory computer-readable medium according to claim 12, wherein identifying the representative system for each grouping includes selecting one of the system configurations of the grouping whose attribute values have maximal sharing among the group members.

20. A non-transitory computer-readable medium according to claim 12, wherein identifying the representative system includes utilizing context information drawn from known constraints of the testing, known issues to be tested for, and vulnerable areas of the product.

21. A non-transitory computer-readable medium according to claim 12, wherein identifying the representative system includes utilizing statistical techniques to find the representatives of the groupings of system configurations.

22. A non-transitory computer-readable medium according to claim 12, wherein applying the classification includes monitoring for the second case and reporting it upon encountering it in operation.

* * * * *